(12) United States Patent
Effenberger

(10) Patent No.: US 7,877,013 B2
(45) Date of Patent: Jan. 25, 2011

(54) METHOD AND SYSTEM FOR RANDOM CHANNEL ASSIGNMENT IN WDM BASED PASSIVE OPTICAL NETWORKS

(75) Inventor: Frank J. Effenberger, Freehold, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 861 days.

(21) Appl. No.: 11/679,017

(22) Filed: Feb. 26, 2007

(65) Prior Publication Data

US 2008/0050119 A1  Feb. 28, 2008

Related U.S. Application Data

(60) Provisional application No. 60/823,449, filed on Aug. 24, 2006.

(51) Int. Cl.
*H04J 14/00* (2006.01)
(52) U.S. Cl. .............. 398/68; 398/72; 398/69; 398/100; 370/352; 370/468; 370/392; 370/395.31; 725/105; 725/106; 725/127; 725/129; 385/24; 385/14; 385/27
(58) Field of Classification Search .............. 398/68, 398/66, 72, 71, 43, 58, 74, 7, 67, 70, 59, 398/79, 98, 99, 100, 33, 36, 38, 31, 25, 26, 398/27, 10, 17, 85, 95, 149, 73, 84, 182, 398/202, 195, 196, 197, 198; 385/12, 13, 385/24, 27, 37, 14; 370/352, 392, 465, 468, 370/395.31, 432; 725/105, 106, 125, 127, 725/129
See application file for complete search history.

(56) References Cited

U.S. PATENT DOCUMENTS

| | | | | |
|---|---|---|---|---|
| 5,729,369 A | * | 3/1998 | Zirngibl | 398/34 |
| 6,980,742 B1 | * | 12/2005 | Liden et al. | 398/85 |
| 7,020,394 B2 | | 3/2006 | Zhang et al. | |
| 7,499,651 B2 | * | 3/2009 | Bouda et al. | 398/71 |
| 7,502,563 B2 | * | 3/2009 | Nozue et al. | 398/69 |
| 7,636,522 B2 | * | 12/2009 | Nagarajan et al. | 398/79 |

(Continued)

FOREIGN PATENT DOCUMENTS

EP  1130841 A1 * 9/2001

(Continued)

OTHER PUBLICATIONS

Hui Zang, A Review Of Routing And wavelength Assignment Approaches For Wavelength-Routed Optical WDM Networks, Jan. 2000, Optical Networks Magazine—SPIE/Baltzer Science Publishers, pp. 47-60.*

(Continued)

*Primary Examiner*—Hanh Phan
(74) *Attorney, Agent, or Firm*—Conley Rose, P.C.; Grant Rodolph

(57) ABSTRACT

A wavelength division multiplexing based passive optical network is disclosed. The network includes an optical line terminal; a power optical splitter connecting to the optical line terminal by an optical fiber; and several optical network units. Each of the optical network units connects to the power optical splitter by each of other optical fibers by a random process.

20 Claims, 4 Drawing Sheets

U.S. PATENT DOCUMENTS

| | | | | |
|---|---|---|---|---|
| 2005/0123300 A1* | 6/2005 | Kim et al. | .................. | 398/84 |
| 2007/0166037 A1* | 7/2007 | Palacharla et al. | ............ | 398/72 |
| 2007/0280681 A1* | 12/2007 | Frankel et al. | ................. | 398/5 |
| 2008/0267627 A1* | 10/2008 | Effenberger | ................. | 398/72 |

FOREIGN PATENT DOCUMENTS

EP         1458214 A2 *   9/2004

OTHER PUBLICATIONS

Sorin, Wayne; "FTTx-Next Generation BroadBand Access"; Novera Optics; PowerPoint Presentation; Feb. 17, 2005; 23 pgs.

Koonen, Ton; "Fibre-Optic Techniques for Broadband Access Networks"; COBRA Institute, The Netherlands; 2005; pp. 49-65.

Banerjee, Amitabha, et al.; "Wavelength-Division-Multiplexed Passive Optical Network (WDM-PON) Technologies for Broadband Access: A Review"; Optical Society of America; Oct. 27, 2005; pp. 737-758.

Nowak, David, et al.; "FTTH: The Overview of Existing Technologies"; Proc. of Spie Opto-Ireland 2005: Optoelectronics, Photonic Devices, and Optical Networks, pp. 500-509, vol. 5825; Dublin, Ireland; Apr. 2005.

Chan, Chun-Kit, et al.; "WDM PON for Next-Generation Optical Broadband Access Networks"; Opto-Electronics and Communications Conference, OECC 2006; Jul. 2006; 3 pgs.

Wong, Elaine, et al.; "Directly-Modulated Self-Seeding Reflective SOAs as Colorless Transmitters for WDM Passive Optical Networks"; Proc. Optical Fiber Communications Conference; Mar. 2006; 3 pgs.

* cited by examiner

METHOD AND SYSTEM FOR RANDOM CHANNEL ASSIGNMENT IN WDM BASED PASSIVE OPTICAL NETWORKS

CROSS REFERENCE TO RELATED APPLICATION

This application claims the benefit of U.S. Provisional Application Ser. No. 60/823,449, filed Aug. 24, 2006, entitled: RANDOM CHANNEL ASSIGNMENT IN A WDM-BASED PON by inventor Frank J. Effenberger.

FIELD OF INVENTION

The present invention generally relates to optical network systems, and more specifically, relates to Wavelength Division Multiplexing (WDM) based passive optical networks (PONs).

BACKGROUND OF THE INVENTION

A passive optical network (PON) includes a passive optical power splitter/combiner that feeds individual branching fibers to end users. The PON also has a tree topology that maximizes coverage with minimum network splits, thus reducing optical power loss. In addition, a common fiber feeder part of a PON is shared by all optical network units (ONUs) WITH terminating branching fibers. Moreover, traffic sent downstream from an optical line terminal (OLT) at a local exchange is simply broadcast by an optical power splitter to every ONU. Sending traffic from an ONU upstream to a local exchange, however, requires accurate multiple access techniques in order to multiplex collision-free traffic generated by the ONUs onto the common feeder fiber.

At least four major categories of multiple access techniques for fiber have been developed. These techniques include: Time Division Multiple Access (TDMA), SubCarrier Multiple Access (SCMA), Wavelength Division Multiple Access (WDMA), and Optical Code Division Multiple Access (OCDMA).

In a WDM-PON network, each ONU uses a wavelength channel to send packets to an OLT at a local exchange. In addition, the wavelength channel constitutes an independent communication channel and may carry a different signal format from other wavelength channels carried by other ONUs connecting to the OLT.

Conventionally, a WDM-PON network is designed to make each hardware unit at each endpoint, as well as each wavelength selective multiplexing element in the network, tune to a unique wavelength. This design works for wavelength independent power splitting PONs. However, a network with such a design is difficult to manage and prone to errors. One of conventional ways to improve performance of such a design is to implement "colorless" end-point equipment. In a colorless WDM-PON network, an ONU has no intrinsic channel assignment. The ONU obtains a channel assignment by virtue of what fiber the ONU is attached to on the network. This typically assumes that the network uses a WDM device as a splitting element. The physical effects used in this type of network design are either injection locking of a broadband laser source, or reflective modulation of downstream light.

However, these conventional schemes for WDM-PONs are not ideal to provide a complete solution for prevention of errors. Furthermore, because a WDM device is required in such a network design and all PONs currently deployed use a wavelength independent power splitter, these schemes require PON reconstruction.

Therefore, there is a need to develop a WDM scheme that operates over a power splitting PON infrastructure that does not require wavelength selected ONUs.

SUMMARY OF THE INVENTION

The present invention discloses a system for a WDM based PON network in which the system randomly assigns each ONU channel. When ONUs are manufactured and shipped to the field for implementation, a uniform but random distribution of channel assignment is maintained. As these ONUs are connected to the network, each channel is loaded in a random process.

The present invention also discloses a "selectionless ONU" scheme in a WDM based PON network. In the selectionless scheme, each ONU may transmit virtually any wavelength bands in upstream signal transmissions. This scheme may be accomplished by arranging receivers adjacent to each other in an OLT of the network. As a result, each receiver's sensitivity waveband may be immediately adjacent and cross over with another adjacent receiver's sensitivity waveband. Thus, the OLT electronics may be able to receive and recover signals from each ONU.

Therefore, in accordance with the previous summary, objects, features and advantages of the present disclosure will become apparent to one skilled in the art from the subsequent description and the appended claims taken in conjunction with the accompanying drawings.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE PREFERRED EMBODIMENTS

The present disclosure can be described by the embodiments given below. It is understood, however, that the embodiments below are not necessarily limitations to the present disclosure, but are used to describe a typical implementation of the invention.

Although only a few exemplary embodiments of this invention have been described in detail above, those skilled in the art will readily appreciate that many modifications are possible in the exemplary embodiments. It is understood that several modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

Figure 1:
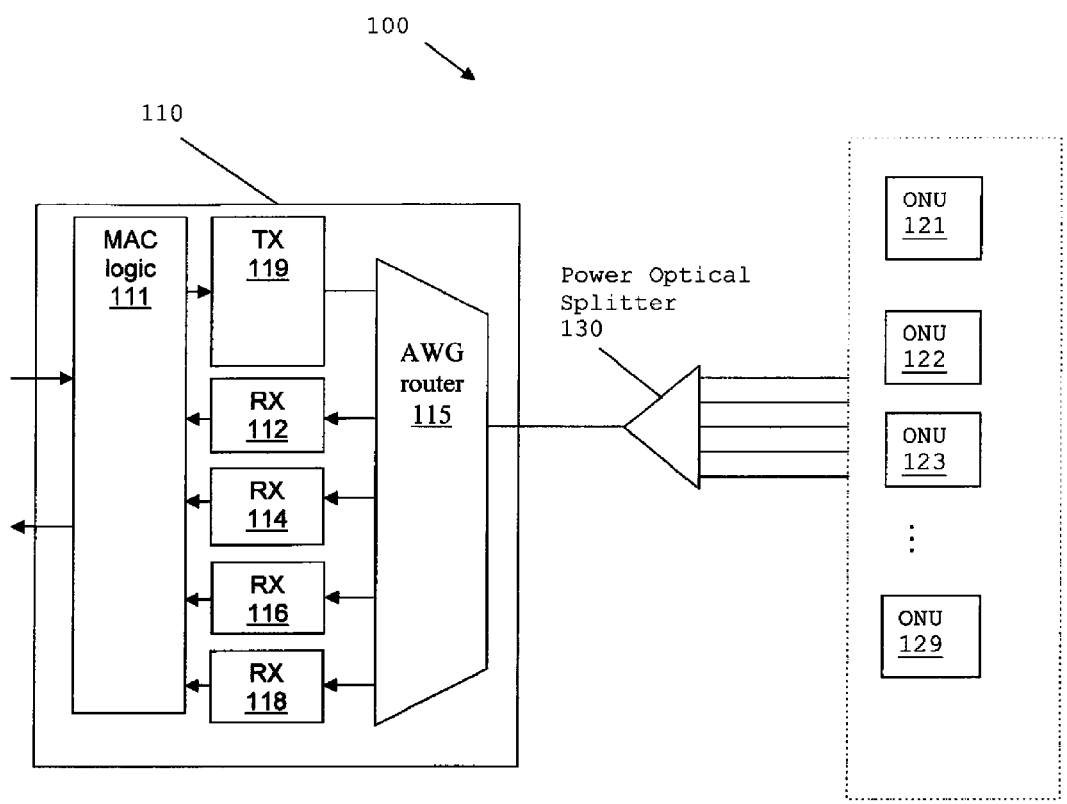
FIG. 1 is a WDM based PON system according to the present invention.

Now referring to FIG. 1, a WDM based PON (100) according to the present invention is illustrated. Network (100) includes an OLT (110), a power optical splitter (130), and a plurality of ONUs including ONU (121), ONU (122), ONU (123), and ONU (129). As shown in FIG. 1, ONU (121), ONU (122), ONU (123), and ONU (129) connect to power optical splitter (130) via optical fibers. Power optical splitter (130) connects to OLT (110) via another optical fiber. OLT (110) further includes an Arrayed Waveguide Grating (AWG) Router (115), a MAC logic unit (111), and a downstream Transmitter (119), and a plurality of upstream receivers including Receiver (112), Receiver (114), Receiver (116), and Receiver (118). A person of ordinary skill in the art will understand, downstream signals may be served by N WDM channels, and upstream signals may be served by M WDM channels. Both N and M can be any small integer. In addition, OLT (110) may possess N downstream transmitters and M upstream receivers. However, each ONU, including ONU (121), ONU (122), ONU (123), and ONU (129), may contain only one downstream receiver and one upstream transmitter.

In conventional designs, wavelength assignment to an ONU is fixed by virtue of the design—that is, each unit operates on a particular pair of channels that can not be changed. In addition, each downstream channel uses a multiplexing scheme such that multiple ONUs can share the downstream channel. Moreover, each upstream channel uses a multiplexing scheme such that multiple ONUs can share the upstream channel. There are several such schemes that are based on TDMA or CDMA schemes, including ITU B-PON (G.983.x), ITU G-PON (G.984.x), and IEEE 802.3ah systems. These schemes are all electronic and multiple identical ONUs sharing a channel are coordinated and configured automatically under stored program control.

The present invention provides that random channel assignment to an ONU. As ONUs are manufactured and shipped to the field, a uniform but random distribution of channel assignment is maintained. As each ONU is connected to the network (100), each of the channels are loaded in the random process. Practically, the impact of random loading is small and manageable. Additionally, the cost of the random channel assigned ONUs is not much more than conventional non-WDM ONUS, and the OLT cost is the same as non-WDM OLTs. Therefore, a significant savings over other WDM schemes can be achieved.

An example that further illustrates this embodiment of the present invention will now be described. Consider a Gigabit PON (G-PON) based network, where a non-WDM system supports 64 ONUs per PON, using the 1480 to 1580 nm band for downstream communications and the 1260 to 1360 nm band for upstream communications. Using a conventional coarse WDM (CWDM) grid of wavelengths, it is possible to construct economical transceivers that use 20 nm spaced wavelength channels. Therefore, if the existing 100 nm wavelength bands are divided into five 20 nm bands, a network according to the present invention may be implemented where downstream channels may equal upstream channels (N=M=5). On average, each channel pair may have 64/5 which is approximately 13 ONUs. Understanding that a PON may be loaded with 64 ONUs, there is usually less than 16 ONUs sharing a channel pair 90% of the time, and there is usually less than 20 ONUs sharing a channel pair 99% of the time. In practice, PONs are usually not loaded to ultimate capacity. Therefore, chances of exceeding this design rule may even be lower. Even in rare cases when this design rule is exceeded, the only consequence may be marginally lower performance for the ONUs in the crowded channel pair, and this will probably not cause a failure of service.

In one embodiment, the present invention provides an arrangement wherein each downstream channel may associate with a single upstream channel. In this embodiment, the number of channel pairs may equal to the number of downstream channels. In another embodiment, the present invention provides ONUs that have random pairings of upstream and downstream assignments. This additional randomization may require OLT's management of an entire multi-PON system, but may reduce chances of having less capacity in both directions in the system.

The present invention also provides an embodiment with a WDM-PON system where downstream communication may use a single high-speed channel and upstream communication may use multiple, slower channels. In another embodiment, the system uses high speed (such as 10 Gbit/s) channels, in downstream communication because downstream communication has only one single transmitter operating continuously. In contrast, upstream communication has multiple transmitters that operate in burst mode. This complicates transmission and makes lower speeds more practical. Hence, this embodiment illustrates a scheme providing a single downstream channel and multiple upstream channels to balance aggregate capacity of both downstream and upstream communication in the system.

A WDM-PON system designed according to the present invention may use well defined wavelength bands, with pass-bands and guard-bands for signal transmission. In downstream communication, a conventional design may be used. However, in upstream communication, the present invention allows each ONU to transmit at virtually any wavelength. Therefore, the need to select ONU lasers into wavelength bands is eliminated. This scheme is called the "selectionless ONU" scheme.

Figure 2:
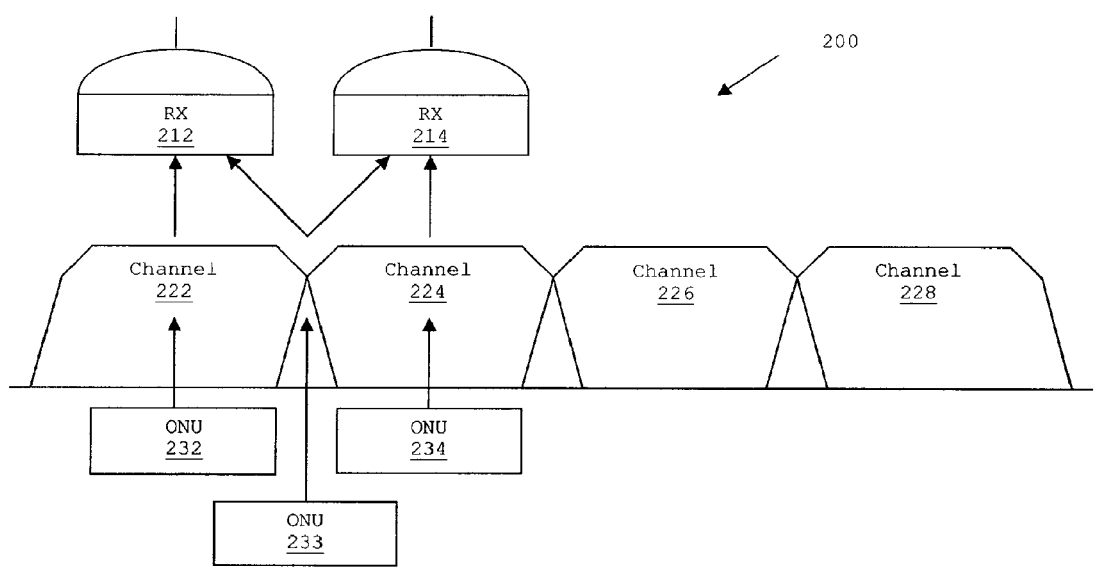
FIG. 2 depicts adjacent channel scheduling of a selectionless ONU scheme in a WDM based PON system according to the present invention.

In the selectionless ONU scheme designed according to the present invention, each receiver's sensitivity waveband is immediately adjacent and crosses over with the adjacent receiver's wavebands. FIG. 2 illustrates adjacent channel scheduling of selectionless ONU scheme (200) in a WDM based PON system according to the present invention. Scheme (200) includes a plurality of OLT receivers, including Receiver (212) and Receiver (214); four receiver's channels, Channel (222), Channel (224), Channel (226), and Channel (228); and three ONUs, ONU (232), ONU (233), and ONU (234). In this embodiment, ONU (232) transmits signals in Channel (222). Thus, only Receiver (212) receives signals from ONU (232). Similarly, ONU (234) transmits signals in Channel (224). Therefore, only Receiver (214) may receive signals from ONU (234). Also shown in FIG. 2, ONU (233) may transmit signals in a crossover portion of Channel (222) and Channel (224). Accordingly, both Receiver (212) and Receiver (214) may receive signals from ONU (233). In this embodiment, no matter what wavelength an ONU uses, corresponding light for the ONU can be received by one receiver if the ONU transmits in a wavelength at the center of a channel, and possibly two receivers if the ONU transmits in a wavelength at the edge of a channel. In either case, OLT electronics may be able to receive signals from either ONU.

The selectionless ONU scheme of the present invention allows upstream channel overlap to be scheduled in order to avoid interference between adjacent channels. As illustrated in FIG. 2, ONU (232) is on the center of Channel (222). Therefore, signals from ONU (232) are received only on Receiver (212), and thus members of the Receiver (212) reception group. Similarly, ONU (234) is on the center of Channel (224). Accordingly, signals from ONU (234) are received only on Receiver (214), and thereby members of the Receiver (214) reception group. However, ONU (233) is on the edge of Channel (222) and Channel (224). Consequently, signals from ONU (233) are received on both Receiver (212) and Receiver (214), and therefore members of both Receiver (212) and Receiver (214). In this latter case, the OLT should coordinate schedules of PONs such that members of any reception group do not transmit at the same time. For example, Receiver (212) and Receiver (214) should not transmit signals simultaneously.

Figure 3:
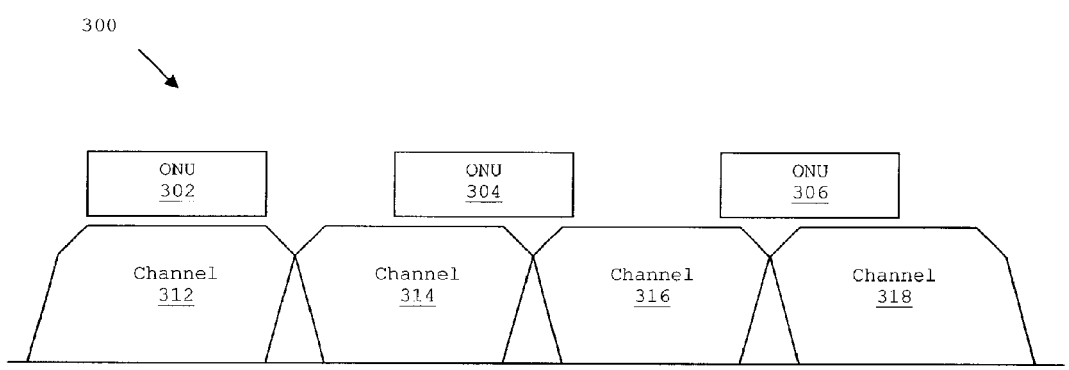
FIG. 3 depicts channel spacing of the selectionless ONU scheme in a WDM based PON system according to the present invention.

The selectionless ONU scheme of the present invention also allows the use of inexpensive ONU transmitters that may vary in wavelength by about 10 nm over temperature and time. FIG. 3 illustrates channel spacing of a selectionless ONU scheme (300) in a WDM based PON system according to the present invention. The scheme (300) includes three ONUS, including ONU (302), ONU (304), and ONU (306); and four Receiver channels, including Channel (312), Channel (314), Channel (316), and Channel (318). In this embodiment, ONU (302) transmits signals corresponding only to Channel (312). ONU (304) transmits signals mostly corresponding to Channel (314), but sometimes to Channel (316). In addition, ONU (306) transmits signals mostly corresponding to Channel (318), but sometimes to Channel (316). In this embodiment, the OLT monitors and controls all ONUs wavelength drifting using a non-deterministic wavelength hopping scheme. In another embodiment, OLT receiver wavelength scheduling is devised such that an ONU may stay in one group consistently. This may be achieved by spacing the receiver's channel bands wide enough so that the ONU wavelength variation is less than a stop band separating non-adjacent channels. This embodiment is designed so that the difference from the highest wavelength of Channel (312) and the lowest wavelength of Channel (318) is set to be 10 nm, and the ONU wavelength variation is 10 nm, to ensure that the ONU may not change group membership over time.

Figure 4:
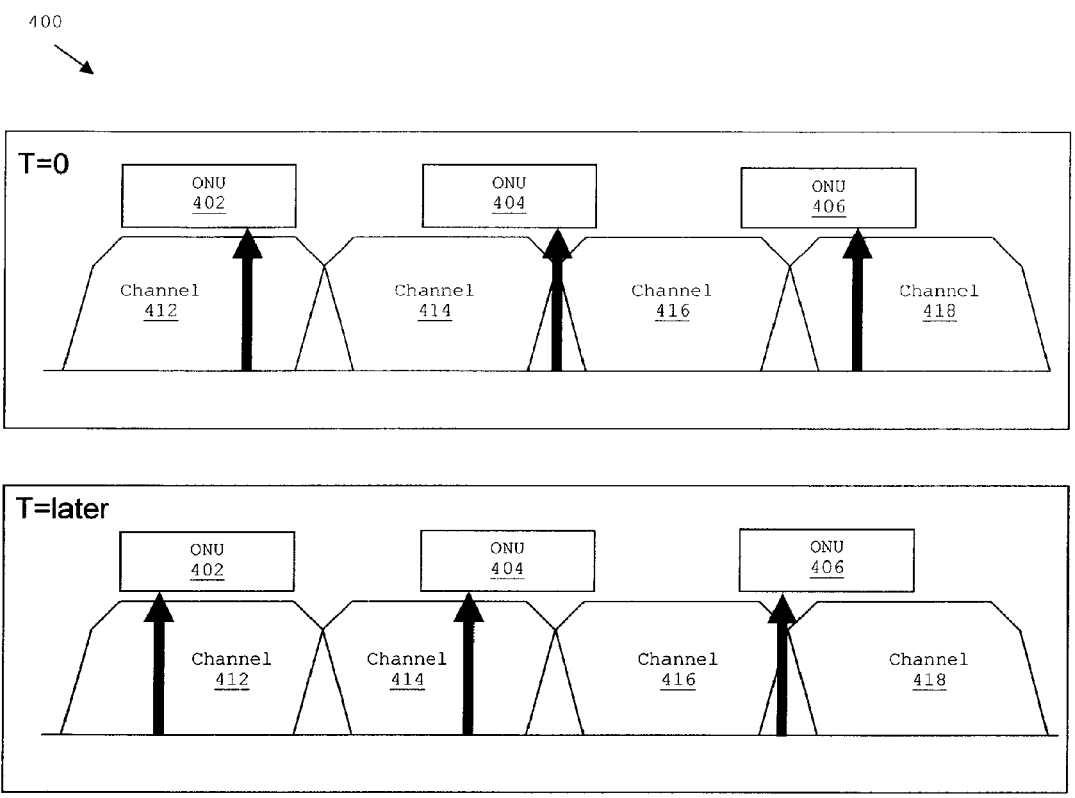
FIG. 4 depicts ONU channel discovery of the selectionless ONU scheme in a WDM based PON system according to the present invention.

The selectionless ONU scheme according to the present invention also allows discovery of ONU group membership to ensure proper signal transmission from each ONU to the OLT. FIG. 4 depicts ONU channel discovery of selectionless ONU scheme (400) in a WDM based PON system according to the present invention. Scheme (400) illustrates ONU channel discovery at an initial time (T=0) and at a later time (T=later). When ONU (402), ONU (404), or ONU (406) is first connected (T=0) to the network and activated, ONU (402), ONU (404), or ONU (406) begin to transmit signals during special intervals of time specifically reserved for the OLT to discover ONUs. At this time, the OLT may inspect upstream receivers to see which receiver is receiving upstream light. If two adjacent receivers receive light from a particular ONU, both Channel (414) and adjacent Channel (416) receive light from ONU (404), then ONU (404) can be assigned on the edge between Channel (414) and Channel (416). In this embodiment, Channel (412) receives light from ONU (402), and Channel (418) receives light from ONU (406), then ONU (402) may be provisionally placed in a receiver's group corresponding to Channel (412), and ONU (406) may be provisionally placed in a receiver's group corresponding to Channel (418). However, over time, the ONUs might drift in wavelength, and be carried into either channel edge, or into an adjacent channel. FIG. 4 illustrates that at a later time (T=later), ONU (404) drifts to Channel (414), and ONU (406) drifts to the edge between Channel (416) and Channel (418). In this case, the OLT may provisionally re-assign ONU (404) to the receiver's group corresponding to Channel 414, and the OLT may re-assign ONU (406) to be on the edge between Channel (414) and Channel (416).

The previous description of the disclosed embodiments is provided to enable those skilled in the art to make or use the present invention. Various modifications to these embodiments will be readily apparent to those skilled in the art and generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wavelength division multiplexing based passive optical network, comprising:
   an optical line terminal;
   a power optical splitter connecting to the optical line terminal by a first optical fiber; and
   a plurality of optical network units, wherein each of the plurality of optical network units connect to the power optical splitter by a plurality of second optical fibers, and
   wherein a waveband channel is assigned to each of the plurality of optical network units,
   wherein at least some of the optical network units' upstream wavelengths vary over time, and
   wherein the optical line terminal has to re-assign at least one of the optical network units to a new waveband channel due to a variation of the optical network units' upstream wavelength.

2. The network of claim 1 wherein each of the plurality of optical network units have a downstream channel that associates with a single upstream channel and wherein a number of channel pairs equals the number of downstream channels.

3. The network of claim 1 wherein each of the plurality of optical network units have a downstream channel as well as an upstream channel and wherein a pairing of upstream and downstream channels are random.

4. The network of claim 1 wherein each of the plurality of optical network units have a downstream channel and an upstream channel and wherein all the downstream channels use a single high-speed channel and the upstream channels use multiple, slower channels.

5. The network of claim 1 wherein each of the plurality of optical network units have a downstream channel and an upstream channel and wherein high speed channels are used for downstream communication.

6. An optical line terminal (OLT) comprising:
   an arrayed waveguide grating (AWG) router; and
   a plurality of receivers coupled to the AWG router,
   wherein each receiver is associated with one of a plurality of waveband channels,
   wherein at least one waveband channel overlaps at least one of the other waveband channels, and
   wherein the waveband channels are spaced so that an optical network unit (ONU) wavelength variation is less than a stop band separating non-adjacent waveband channels.

7. The OLT of claim 6, wherein the OLT is configured to monitor and control optical network unit (ONU) wavelength drifting using a non-deterministic wavelength hopping scheme.

8. The OLT of claim 6, wherein the OLT is configured to discover optical network units (ONUs) by inspecting the plurality of receivers for upstream light during time intervals reserved for ONU discovery.

9. The OLT of claim 8, wherein the OLT is configured to selectively assign an ONU to a cross-over area shared by two of the waveband channels.

10. The OLT of claim 8, wherein the OLT is configured to selectively assign an ONU to a waveband area that avoids a cross-over area shared by two of the waveband channels.

11. The OLT of claim 8, wherein the OLT is configured to selectively schedule operations of receivers having adjacent waveband channels to avoid interference.

12. The OLT of claim 6 wherein at least some of the OLT receivers' upstream wavelengths vary about 10 nanometers over time, and wherein the OLT has to re-assign at least one of the receivers to a new waveband channel due to the wavelength variation.

13. A method comprising:
routing a light signal from an optical fiber to an arrayed waveguide grating (AWG) router; and
receiving the routed light signal by a plurality of optical line terminal (OLT) receivers in an OLT,
wherein each OLT receiver is associated with only one of a plurality of waveband channels,
wherein at least one waveband channel overlaps at least one of the other waveband channels,
wherein each of a plurality of optical network units (ONUs) is assigned to one of the waveband channels,
wherein at least some of the ONUs' upstream wavelengths vary over time, and
wherein the OLT has to re-assign at least one of the ONUs to a new waveband channel due to a variation of the ONU's upstream wavelength outside of the ONU's assigned waveband channel.

14. The method of claim 13 further comprising controlling optical network unit (ONU) wavelength drifting using a non-deterministic wavelength hopping scheme.

15. The method of claim 13 further comprising spacing the wavelength channels so that an average range of variation for the ONUs' wavelength is less than a stop band separating non-adjacent waveband channels.

16. The method of claim 13 further comprising discovering ONUs by inspecting the plurality of ONUs for upstream light during time intervals reserved for ONU discovery.

17. The method of claim 13 further comprising selectively assigning an ONU to a cross-over area shared by two of the waveband channels.

18. The method of claim 13 further comprising selectively assigning an ONU to a waveband area that avoids a cross-over area shared by two of the waveband channels.

19. The method of claim 13 further comprising selectively scheduling operations of optical network units having adjacent waveband channels to avoid interference.

20. The method of claim 13 further comprising spacing the wavelength channels so that a maximum range of variation for the ONUs' wavelength is less than a stop band separating non-adjacent waveband channels.

* * * * *